March 17, 1931.  C. H. SMOOT  1,796,968
REGULATOR
Filed June 15, 1929
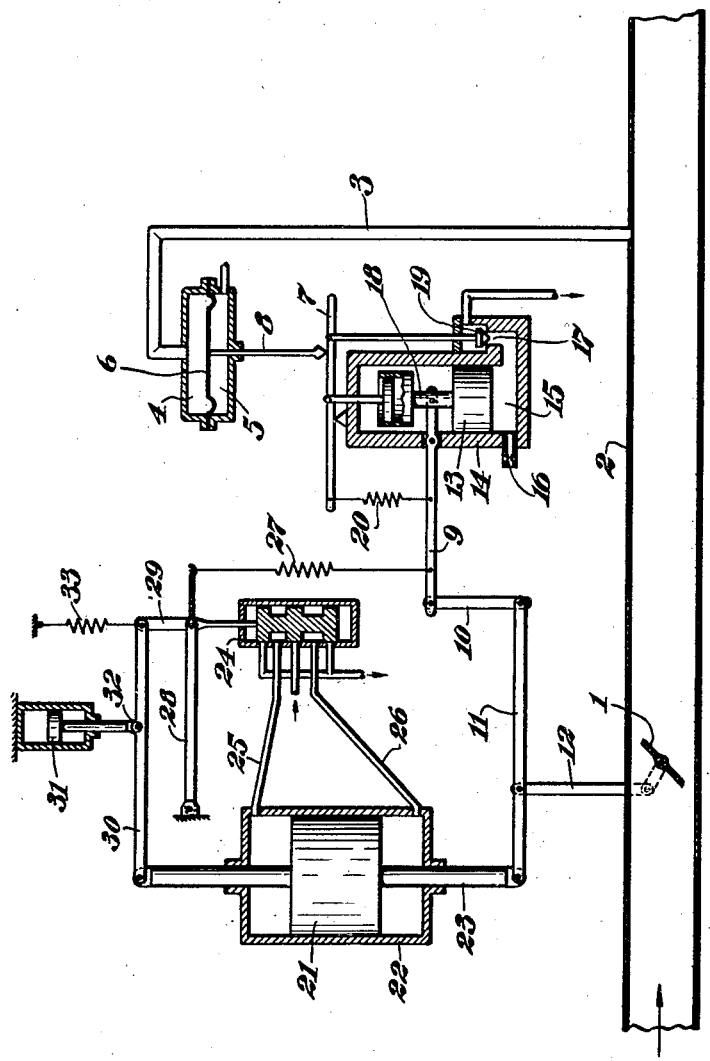
INVENTOR
*Charles H. Smoot,*
BY
ATTORNEYS Patented Mar. 17, 1931

1,796,968

UNITED STATES PATENT OFFICE

CHARLES H. SMOOT, OF MAPLEWOOD, NEW JERSEY

REGULATOR

Application filed June 15, 1929. Serial No. 371,245.

My invention relates to the art of regulation and comprises a novel regulator of the type wherein a force varying as a function of the element controlled opposes a controlling force upon a balance to effect control of the element upon a departure of the balance from neutral. My regulator includes two separate elements each adapted to control the element, one of which is arranged for rapid and yet stable regulation of the element throughout a relatively small range of operation, and the other of which is arranged upon sustained operation of the other about either extreme limit of its range for more powerful regulation of the element through a relatively greater range. My regulator is sensitive, rapid acting and stable and yet of relatively simple construction.

For a better understanding of the novel features of my regulator reference should be had to the accompanying drawing in which I have illustrated one embodiment of my invention as applied to the control of pressure.

Referring to the drawing, a damper 1 controls the flow of fluid through a conduit 2 in response to variations in the pressure of the fluid flow as transmitted through a pipe 3 to a chamber 4 forming a part of the regulator, and in response to a controlling pressure transmitted to a chamber 5 of the regulator, which pressure may be constant or varying depending upon whether or not a constant fluid flow is desired. A diaphragm 6 divides chambers 4 and 5, and movement thereof occasioned by a change in either pressure is transmitted to a pivoted balance lever 7 by means of a rod 8 rigidly attached at one end to the diaphragm and having its other end in engagement with the lever. Movement of lever 7 is arranged to cause a related movement of a power arm 9 and arm 9 is operatively connected by means of link 10, walking beam 11 and bell crank lever 12 with the damper 1 to directly move the same throughout its range of movement. Any desired means for causing a related movement of arm 9 upon deflection of lever 7 may be employed. In the embodiment illustrated these means comprise a piston 13 arranged for vertical movement within a casing 14 in response to the pressure of an auxiliary fluid such as oil, or water, which is admitted to a chamber 15 below the piston through a restricted inlet 16 and which is drained therefrom through a throttled outlet 17. Arm 9 is hinged to the casing 14 and is pivotally mounted on a yoke 18 formed integral with the piston 13. Movement of lever 7 varies the position of a throttling valve 19 to vary the outlet of the auxiliary fluid from chamber 15 and therefore correspondingly vary the upward pressure upon piston 13, to thus cause related movements of lever 7 and arm 9. To insure stable and yet rapid movement of arm 9 upon movement of lever 7, a spring 20 is connected between the lever and the arm, which spring upon movement of arm 9 introduces a stabilizing action in that it adds a force to the lever 7 in such direction as to tend to restore equilibrium of forces thereupon. Where less rapid control is desired, spring 20 may be replaced by any suitable weight sufficient to balance the effect of the weight of rod 8 and diaphragm 5 upon lever 7.

The range of movement of arm 9 is, of course, more or less limited and it can therefore only directly control the damper through correspondingly limited range. My regulator includes means controlled by arm 9 for positioning the damper through a wider range than is possible by direct connection thereto. These means include a power piston 21, operable in a relay cylinder 22 and provided with a piston rod 23 hingedly connected to the walking beam 11. Movement of piston 21 is controlled by a pilot valve 24 which upon operation supplies fluid under pressure to the relay cylinder at one side or the other of the piston and permits the escape of fluid from the other side of the piston through pipes 25 and 26. A spring 27 is connected at one end to arm 9 and at the other end to a lever 28, which lever is pivoted at one end to a fixed support and is linked near its other end to the piston rod 29 of pilot valve 24. A member 30 is linked to the piston rods 23 and 29 and carries the movable member of a dash pot 31 at a point 32 intermediate the connections to the piston rods. The arrangement is such that movement of piston 21 causes member 30 to rotate about the point 32 as a pivot, and to thus operate the pilot valve 24, whereas slow operation of the pilot valve occasioned by movement of rod 28 causes member 30 to pivot about its connection with piston rod 23. A spring 33 connected to member 30 at its point of linkage with rod 29 opposes the actuation of valve 24 by spring 27 and insures normal return of the valve to closed position. The characteristics of springs 27 and 33 and the resistance offered by the dashpot 31 to movement are so chosen as to insure operation of valve 24 only after sustained operation of arm 9 about one or the other of its extreme limits of travel during which time dashpot 31 has permitted the changed tension of the springs 27 and 33 to gradually move member 30 about its point of linkage with piston rod 23.

The operation of the various parts of the regulator have been indicated during the above description, but, for the sake of clarity, a description of the operation of the regulator as a whole will now be given. Assuming that the apparatus is adjusted for constant pressure regulation, with chamber 5 connected to a source of constant pressure, which may, for example, be the atmosphere, then if the pressure in chamber 4 is constant and equal to that in chamber 5, lever 7 will be in neutral position with the tension of spring 20 just balancing the weight of rod 8 and diaphragm 6, pistons 13 and 21 will be stationary and pilot valve 24 closed. If now for any reason, such as an increase in demand for the fluid in conduit 2, the pressure within chamber 4 decreases, lever 7 will be tipped to open throttle valve 19. The opening of valve 19 causes a decrease in pressure beneath piston 13, which piston thereupon moves downward tipping arm 9 about its pivot and causing a partial opening of the damper.

The upward movement of the left end of arm 9, in opening damper 1 decreases the tension of spring 27, which would, in the absence of dashpot 31, cause immediate opening of valve 24 by spring 33. The resistance to movement of dashpot 31 prevents immediate operation of the pilot valve and only permits operation thereof if the pressure decrease in chamber 4 is of considerable duration of time. Assuming such sustained pressure decrease, member 30 is gradually moved about its connection to piston rod 23 as pivot to open valve 24. Fluid under pressure is then supplied through pipe 26 to the lower chamber of the relay cylinder causing upward movement of piston 21 to further open damper 1 and to close the valve 24 through member 30 now pivoting about dashpot 31. The relatively large travel of damper 1, if sufficient to restore the pressure in chamber 4 to that desired, returns arm 9 to its mean position, thus returning the tension of spring 27 to its initial value in balance with spring 33 upon valve 24. If the movement of damper 1 occasioned by the operation of the relay cylinder was not sufficient to restore the pressure to that desired, further operation of the apparatus occurs until balance upon lever 7 is restored.

In the case of initial pressure increase in chamber 4 over that desired, the reverse operation to that above described occurs; a momentary increase causing relatively small closing of damper 1 by arm 9 and no operation of the relay cylinder, while a sustained increase causing closure of the damper first by arm 9 directly and, after a lapse of time, by the piston of the relay cylinder as well.

If desired to regulate for other than constant pressure, it is only necessary to connect chamber 5 to any suitably varying source of pressure, such as a master controller of the type of my Reissue Patent No. 16,507 dated December 21, 1926.

I have now described one modification of my invention as arranged for the control of a damper. Obviously my invention is not concerned with the particular element controlled nor in the particular regulating force or forces acting upon the balance. The particular means illustrated for controlling the damper through a limited range of travel form no part of my present invention and any well known regulating device could be substituted therefor; my invention being concerned with the combination of such device with other power means whereby direct control of the element is effected when small temporary adjustment only is required, and indirect control through additional power means is effected when a greater range of adjustment is necessitated.

I claim:
1. In a regulating apparatus, an element to be controlled, a member movable throughout a definite range and adapted to directly control said element throughout said range, a second member movable throughout a greater range, and adapted when moved to directly control said element, and means associated with both of said members adapted to bring said second member into operation after sustained operation of said first member about either extreme of its range of movement.

2. In apparatus according to claim 1 wherein said associated means include a pilot valve and a dashpot, said valve being adapted to be opened by said first mentioned member in opposition to said dashpot after sustained operation at either extreme of its range, and wherein said second member comprises the piston of a relay cylinder movable in response to actuating fluid controlled by said valve.

3. In an apparatus for controlling the position of an element, the combination comprising a lever movable in response to controlling forces thereupon, a member having a definite range of movement, adapted to be operated in response to movement of said lever and arranged for direct control of said element, a relay cylinder provided with a power piston likewise arranged for direct control of the element, a pilot valve adapted to control the flow of actuating fluid to and from said cylinder, means associated with said member and said valve adapted to operate the latter after sustained operation of said member at either extremity of its range.

4. The combination according to claim 3 wherein said associated means comprise a spring the tension or compression of which when exceeding a predetermined value for a predetermined interval of time operates to cause said valve to open in one direction or the other, and wherein movement of said power piston is arranged to cause closure of said valve.

5. In a regulating apparatus of the type wherein a force varying as a function of the element controlled opposes a regulating force upon a balance to effect control of the element upon an unbalance of said forces, the combination comprising a device actuated by an unbalance of the forces and adapted to position said element, a second device adapted when actuated to position said element, and means for actuating said second device by said first device upon a sustained unbalance of said forces.

6. In an apparatus for controlling the position of an element, the combination comprising a lever movable in response to controlling forces thereupon, an arm having a definite range of movement, adapted to be operated in response to movement of said lever and arranged for direct control of the element, a relay cylinder provided with a power piston likewise arranged for direct control of the element, a pilot valve adapted when operated to control the flow of actuating fluid to and from said cylinder, a dashpot, the movable member of which offers substantial resistance to movement and is mounted upon and serves as a pivot for a link connecting the operating rods of said valve and said power piston, and tensional means connecting said arm and the operating rod of said valve whereby sustained displacement of said arm to either limit of its range of operation operates said valve by overcoming the resistance to movement offered by the movable member of said dashpot.

7. In a regulator of the type wherein a force varying as a function of the element controlled reacts upon the regulator, a primary controlling member, two movable devices operatively related to the element to be controlled but having different effective ranges of movement, and means for causing the movements of said primary controlling member to successively operate such devices.

In testimony whereof, I have signed my name to this specification.

CHARLES H. SMOOT.